United States Patent Office 2,965,537
Patented Dec. 20, 1960

2,965,537
THIOCYANATE PESTICIDE

Irving Rosen, Painesville, Ohio, assignor to Diamond Alkali Company, Cleveland, Ohio, a corporation of Delaware No Drawing. Filed Nov. 28, 1958, Ser. No. 776,709

8 Claims. (Cl. 167—30)

The present invention relates to biologically active and more specifically to fungicidally active 2-halo-p-xylylene dithiocyanates and to a method of using these novel compounds.

More specifically, compositions of this invention embody compounds which may be represented by the structure:

(I)
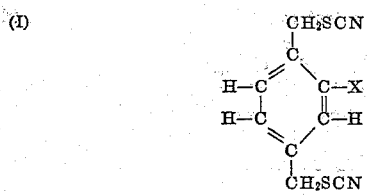

wherein X is a halogen atom, i.e., chlorine, fluorine, bromine or iodine, chlorine being preferred. Specific illustrative 2-halo-p-xylylene dithiocyanate compounds within the scope of the above structure are 2-chloro, 2-bromo, 2-fluoro, and 2-iodo-p-xylylene dithiocyanates.

The foregoing compounds (I) may be prepared by chemically reacting an aralkyl compound of the structure:

(II)
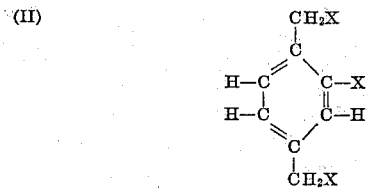

with a thiocyanate compound of the structure:

(III)  M—SCN wherein X is a halogen atom, i.e., a fluorine, chlorine, bromine or iodine atom, chlorine being preferred; and M is a metal ion, e.g., those selected from the group consisting of alkali metals, i.e., sodium, potassium, lithium, rubidium, and cesium, alkaline earth metals, e.g., strontium, barium, calcium, beryllium, and ammonium ions. Specific illustrative thiocyanates include thiocyanates of potassium, sodium, lithium, calcium, magnesium, and ammonium.

The reaction of the thiocyanate and aralkyl compound is ordinarily carried out in the presence of an organic solvent such as a ketone, e.g., acetone, methyl ethyl ketone, methyl isobutyl ketone, or the like, an alcohol, e.g., ethanol, isopropanol, cyclohexanol, or the like. Typically practicable reaction temperatures vary between about 30° and 300° C., such as 40° to 150° C., preferably at the reflux temperature of the solvent employed, i.e., at about 80° C. using methyl ethyl ketone as the solvent. The reaction time generally is about ¼ to 8 hours, e.g., 1 to 5 hours. The reactants ordinarily are combined in a ratio of about 1 mole of the aralkyl compound of structure II, to about 2 to 6 moles of the metal thiocyanate of structure III and a slight excess above that required to dissolve the reactants of the above-mentioned solvents. Exemplary of these ratios is the ratio of 1 mole of the aralkyl compound, to about 2 to 6 moles of sodium, potassium or ammonium thiocyanate to about 2 to 20 moles of methyl ethyl ketone. The crude reaction products of this invention may be isolated by pouring into any suitable solvent, e.g., alcohols and water, followed by filtration of the resulting precipitate.

Purification of the resulting 2-halo-p-xylylene dithiocyanate solid is carried out typically by recrystallization from an organic solvent such as an alcohol, e.g., methanol, ethanol, propanol, butanol, alcohol-water mixtures, such as 50% ethanol-water, and/or hydrocarbons, e.g., xylene and toluene. Although recrystallization is the preferred method of purification of the compounds employed in the practice of this invention, they may also be isolated through distillation, preferably at reduced pressure.

The 2-halo-p-xylylene dithiocyanates are stable compounds which generally are less than 5% soluble in water and greater than 5% soluble in acetone, cyclohexanone and aryl hydrocarbons such as xylene, benzene, toluene, durene, and the like.

While compounds of this invention may be employed in a variety of applications, biological or otherwise, when employed as biologically-active materials, it will be understood, of course, that such compounds may be utilized in diverse formulations, both liquid and solid, including finely-divided powders and granular materials, as well as liquids, such as solutions, concentrates, emulsifiable concentrates, slurries, and the like, depending upon the application intended and the formulation media desired.

These compounds may be used alone or in combination with other biologically-active materials, such as organic phosphates, chlorinated hydrocarbons, insecticides, foliage and soil fungicides, pre- and post-emergent herbicides, and the like.

Thus, it will be appreciated that compounds of this invention may be employed to form biologically-active substances containing such compounds as essential active ingredients thereof, which compositions may also include finely-divided dry or liquid diluents, extenders, fillers, conditioners, solvents, including various clays, diatomaceous earth, talc, spent catalyst, alumina-silica materials, or the like, including water and various organic liquids, such as benzene, toluene, chlorinated benzene, acetone, cyclohexanone, xylene, carbon disulfide, carbon tetrachloride, petroleum distillate fractions, and various mixtures thereof.

When liquid formulations are employed or dry materials prepared which are to be used in liquid form, it is desirable in certain instances additionally to employ a wetting, emulsifying, or dispersing agent to facilitate use of the formulation, e.g., Triton X–155 (alkyl aryl polyether alcohol, U.S. Patent No. 2,504,064). Suitable surface active agents are set forth in an article by John W. McCutcheon in "Soap and Chemical Specialties," vol. 31, pages 7–10 (1955).

The term "carrier" as employed in the specification and claims is intended to refer broadly to the materials constituting a major proportion of a biologically-active material or other formulation and hence includes finely-divided materials, both liquids and solids, as aforementioned, conventionally used in such applications.

In order that those skilled in the art may more completely understand the present invention and the preferred method by which the same may be carried into effect, the following specific examples are offered:

EXAMPLE I

*Preparation of 2-chloro-p-xylylene dithiocyanate*

In a reactor equipped with thermometer, reflux condenser and agitation means is placed a solution of 28.4 g. of sodium thiocyanate (0.352 mol) in 175 ml. of methyl ethyl ketone and 31.0 g. (0.148 mol) of 2-chloro-p-xylylene dichloride. The reactants are refluxed for a period of about 3½ hours. The reactant mixture is then poured into about 1 liter of water, the solid which separates being filtered, washed with water, dried, and recrystallized from isopropanol, yielding about 30 g. of the desired $C_{10}H_7S_2N_2Cl$ melting at 108–109° C. Preparation of the desired product is further indicated by the following elemental analytical data:

| Element | Actual Percent by Weight | Calculated Percent by Weight |
|---|---|---|
| C | 47.3 | 47.2 |
| H | 2.7 | 2.8 |
| S | 24.8 | 25.1 |

EXAMPLE II

Spore germination tests on glass slides are conducted via the test tube dilution method adopted from the procedure recommended by the American Phytopathological Society's committee on standardization of fungicidal tests. Using this procedure, 2-chloro-p-xylylene dithiocyanate in aqueous formulations at concentrations of 1000, 100, 10 and 1.0 p.p.m., respectively, is tested for its ability to inhibit germination of spores from 7 to 10-day-old cultures of Alternaria oleracea and Monilinia fructicola. These concentrations refer to initial concentrations before diluting 4 volumes with 1 volume of spore stimulant and spore suspension. Germination records are taken after 20 hours of incubation at 22° C. by counting 100 spores. Results indicate that concentrations of about 1.0–10 p.p.m. and 10–100 p.p.m. afford disease control for the A. oleracea and M. fructicola, respectively.

EXAMPLE III

To test phytotoxic effect on plants of 2-chloro-p-xylylene dithiocyanate, tomato plants, variety Bonny Best, 5 to 7 inches tall; corn, variety Cornell M–1 (field corn), 4 to 6 inches tall; bean, variety Tendergreen, just as the trifoliate leaves are beginning to unfold; and oats, variety Clinton, 4 to 5 inches tall, are sprayed with an aqueous test formulation (0.64% product of Example I—5% acetone—0.01% Triton X–155—balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure, results indicate that 2-chloro-p-xylylene dithiocyanate receives a rating of 0 for each of the test plants thus demonstrating that unlike alkylbenzyl thiocyanates, i.e., 4-isopropylbenzyl thiocyanate which are herbicidal, compositions of this invention may be used as foliage fungicides without injury to the plants.

EXAMPLE IV

To detect root absorption and translocation of plants when contacted with the product of Example I, tomato plants, variety Bonny Best, 5 to 7 inches tall and corn plants, variety Cornell M–1 (field corn), 4 to 6 inches tall, are treated by pouring 51 ml. of a 2000 p.p.m. aqueous test formulation (2000 p.p.m. product of Example I—5% acetone—0.01% Triton X–155—balance water) onto the soil of 4 inch pots (102 mg./pot or approximately equivalent to 128 lbs./acre) in which the plants are growing. The plants are held under controlled greenhouse conditions for at least 10 days before examination after which phytotoxicity of the test compound is evaluated. Using this procedure, results indicate that the compounds of this invention when applied to the soil around the test plants do not cause injury thus demonstrating that these compositions can be used as fungicides in this manner.

EXAMPLE V

In order to make an in vitro evaluation of the product of Example I of this example as a contact nematode poison, non-plant parasite nematodes (Panagrellus redivivus) are exposed to the test chemical in small watch glasses (27 mm. diameter x 8 mm. deep), within a 9 cm. Petri dish. An aqueous test formulation (1000 p.p.m. 2-chloro-p-xylylene dithiocyanate—5% acetone—0.01% Triton X–155—balance water) is used. Results are recorded 24 hours after treatment and from these 100% nematode mortality is observed.

EXAMPLE VI

Composted greenhouse soil in ½ gallon glazed crocks is infested with 3–5 g. of knotted or galled tomato roots containing the root knot nematode, Meloidogyne. Treatment with 2-chloro-p-xylylene dithiocyanate at a rate equivalent to 512 lbs./acre in a primary test (770 mg./crock) is effected by mixing the test chemical intimately with the soil. An indicator crop of tomato is planted in the crocks 4 to 7 days after treatment and the degree of knotting or galling is used as an index of the nematocidal activity of the test material. A rating system of 0 for none to 5 for severe nematode infestation comparable to controls is used. Using the foregoing procedure, greater than 50% nematode control is obtained. Thus the results of this example, in combination with the results from Example 5, indicate that the product of Example I is effective as both a plant and non-plant nematocide.

EXAMPLE VII

In order to compare the fungicidal activity of the compounds of this invention with other analogues, a tomato foliage disease test is run measuring the ability of various test compounds, to protect tomato foliage against the early blight fungus, Alternaria solani, and the late blight fungus, Phytophthora infestans. The method used employs tomato plants 5 to 7 inches high of the variety Bonny Best. Duplicate plants, 1 set for each test fungus, are sprayed with 100 ml. of a test formulation at various concentrations between 4 and 400 p.p.m. (concentration test chemical—5% acetone—0.01% Triton X–155—balance water) using 40 lbs. air pressure while being rotated on a turntable in a spray chamber. After the spray deposit is dry, the treated plants and comparable untreated controls are sprayed with spore suspension containing approximately 20,000 conidia of A. solani per ml. or 150,000 sporangia of P. infestans per ml. The atomizer used delivers 20 ml. in 30 seconds.

The thus-innoculated plants are held in a 100% humid atmosphere for 24 hours at between 60° and 70° F. to permit spore germination and infection before removal to a greenhouse. After 2 to 4 days, lesion counts are made on the three uppermost fully expanded leaves. Employing this procedure, the so-called ED–95 values, i.e., the concentration which causes greater than 95% disease control, are determined on the test compounds and enumerated in Table I.

TABLE I

| Compound | ED 95 E. Blight, p.p.m. | ED 95 L. Blight, p.p.m. |
|---|---|---|
| 2-chloro-p-xylylene dithiocyanate | <4 | <50 |
| $\begin{array}{c} CH_2SCN \\ | \\ C \\ H-C^{\diagup \;\diagdown}C-Cl \\ \| \quad \| \\ H-C_{\diagdown \;\diagup}C-H \\ C \\ | \\ CH_2SCN \end{array}$ | | |

TABLE I—Continued

| Compound | ED 95 E. Blight, p.p.m. | ED 95 L. Blight, p.p.m. |
|---|---|---|
| 2,5-dichloro-p-xylylene dithiocyanate | >400 | >400 |
| 2,3,5,6-tetrachloro-p-xylylene dithiocyanate | >400 | >400 |
| 1,2,4,5-tetramethyl-3,6-bis(thiocyanatemethyl) benzene | >400 | >400 |
| 2-chlorobenzyl thiocyanate | >400 | >400 |
| 2,6-dichlorobenzyl thiocyanate | >400 | >400 |
| 2,4-dichlorobenzyl thiocyanate | >400 | >400 |
| 3-thiocyano-5-trichloromethyl-1-cyclopentene | >400 | >400 |

As the foregoing data indicate, 2-halo-p-xylylene dithiocyanates exhibit a singularly effective and surprising fungicidal activity which is not shared by other thiocyanate compounds.

It is to be understood that although the invention has been described with specific reference to particular embodiments thereof, it is not to be so limited since changes and alterations therein may be made which are within the full intended scope of this invention as defined by the appended claims.

What is claimed is:

1. A biologically-active composition of matter comprising a major proportion of a carrier and an active amount of 2-halo-p-xylylene dithiocyanate.

2. A biologically-active composition of matter comprising a major proportion of a carrier and an active amount of 2-chloro-p-xylylene dithiocyanate.

3. The method of killing nematodes comprising contacting said nematodes with a nematocidal amount of 2-halo-p-xylylene dithiocyanate.

4. The method of killing nematodes comprising contacting said nematodes with a nematocidal amount of 2-chloro-p-xylylene dithiocyanate.

5. The method of controlling fungus growth which comprises contacting said fungus with fungicidal amount of a 2-halo-p-xylylene dithiocyanate.

6. The method of controlling fungus growth which comprises contacting said fungus with a fungicidal amount of 2-chloro-p-xylylene dithiocyanate.

7. The method of combating fungus growth upon foliage which comprises contacting said foliage with a fungicidal amount of 2-halo-p-xylylene dithiocyanate.

8. The method of combating fungus growth upon foliage which comprises contacting said foliage with a fungicidal amount of 2-chloro-p-xylylene dithiocyanate.

References Cited in the file of this patent

UNITED STATES PATENTS

| | | |
|---|---|---|
| 2,080,770 | Goldschmidt | May 18, 1937 |
| 2,377,446 | Payne | June 5, 1945 |
| 2,415,251 | Leavitt | Feb. 4, 1947 |
| 2,730,547 | Dye | Jan. 10, 1956 |
| 2,743,209 | Jones | Apr. 24, 1956 |
| 2,779,680 | Wolf | Jan. 29, 1957 |
| 2,794,727 | Barrons | June 4, 1957 |
| 2,802,021 | Heininger | Aug. 6, 1957 |
| 2,802,818 | Wheeler | Aug. 13, 1957 |
| 2,809,983 | Heininger | Oct. 15, 1957 |
| 2,855,425 | Tolkmuth | Oct. 7, 1958 |